Nov. 7, 1950          J. A. BLAIR          2,529,129
AUTOMATIC TRANSMISSION CONTROL APPARATUS
Filed May 18, 1946          2 Sheets-Sheet 1
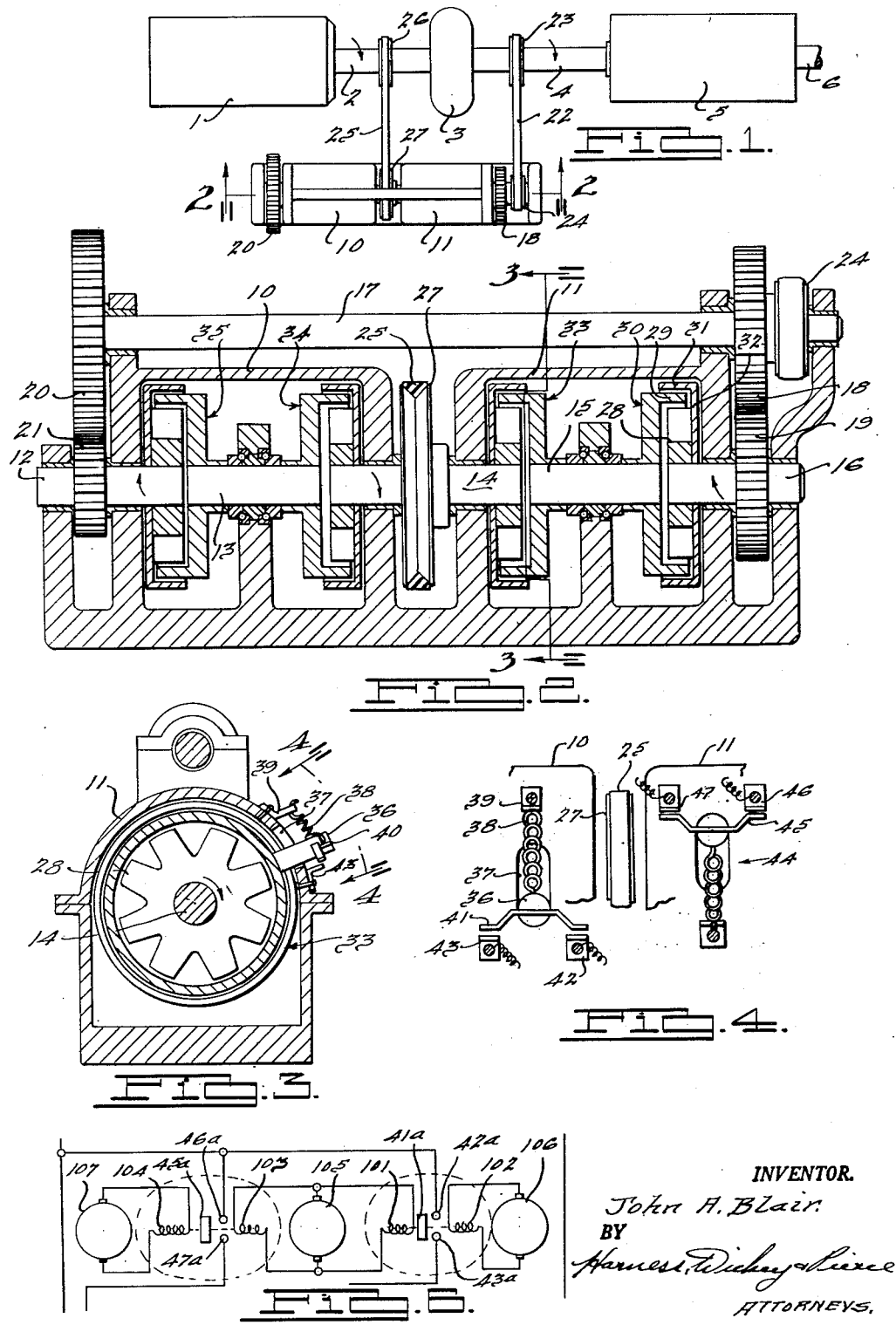
INVENTOR.
John A. Blair.

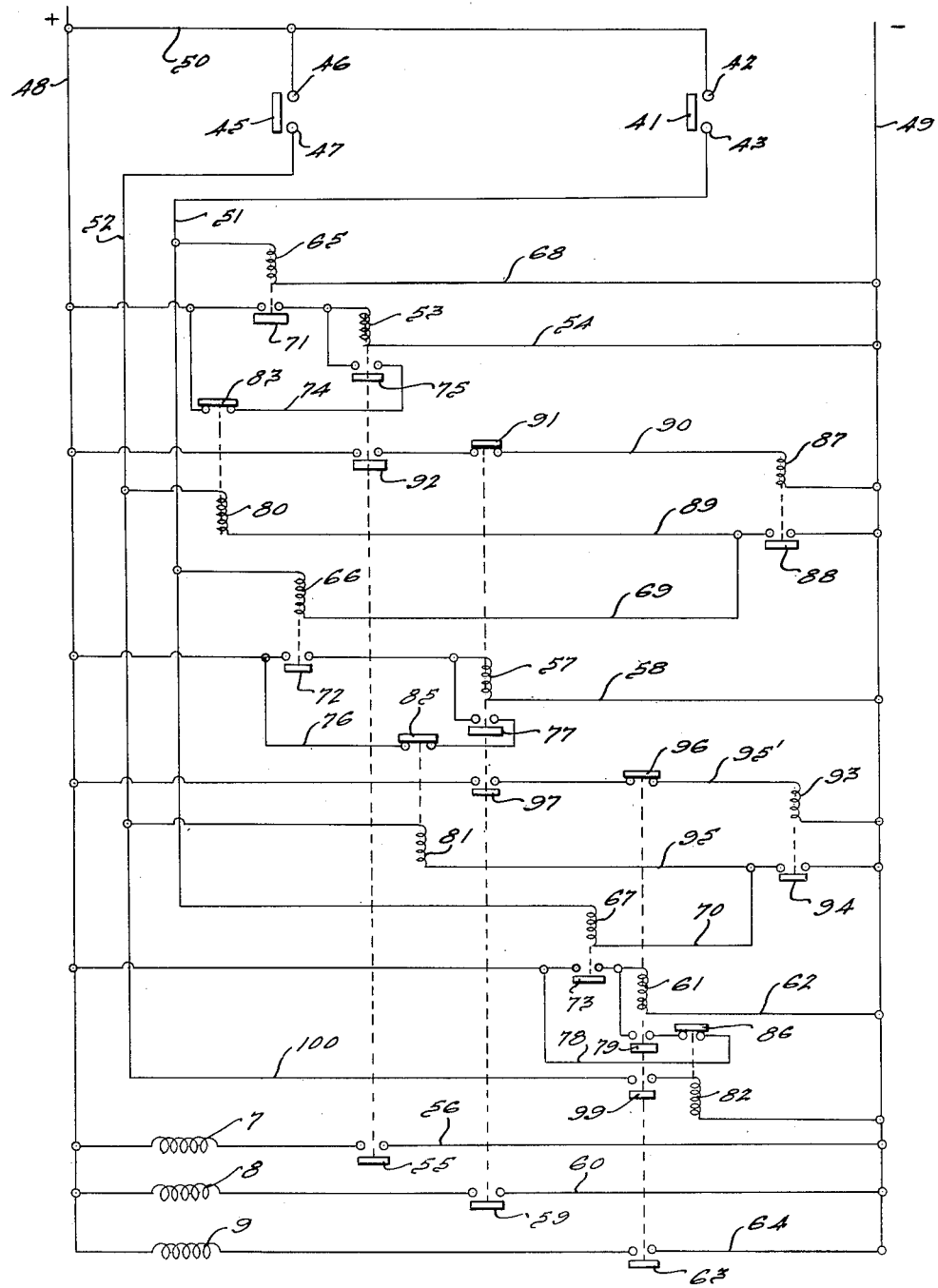

Patented Nov. 7, 1950

2,529,129

UNITED STATES PATENT OFFICE 2,529,129

AUTOMATIC TRANSMISSION CONTROL APPARATUS

John A. Blair, Pleasant Ridge, Mich., assignor to Charles M. O'Leary, Los Angeles, Calif.

Application May 18, 1946, Serial No. 670,821

15 Claims. (Cl. 74—731)

1

The present invention relates to a mechanical power transmission control apparatus adapted for use with a hydrokinetic torque converter drive and capable of changing the speed ratios in a multiple change speed mechanical transmission in response to the speed ratio of the input and output shafts of the torque converter.

Hydrokinetic torque converters provide an automatic infinitely variable speed ratio drive which is highly desirable for starting heavy loads. However, the efficiency of such torque converters increases to a maximum as the speed ratio of the output to the input shafts increases and then falls off to zero before that ratio reaches unity. Consequently, torque converters are not satisfactory for use in the low torque, high speed ratio range. It has been proposed that this difficulty be overcome by utilizing a change speed mechanical transmission associated with the converter output shaft and changing the speed ratio of the transmission in such a manner that the speed ratio of the converter remains within its efficient range. Such an apparatus is disclosed in the copending application of Charles M. O'Leary, Serial No. 647,677, filed February 15, 1946.

In the above-mentioned O'Leary apparatus, the desired result is achieved by the use of speed ratio responsive devices operated by a differential gear mechanism connected between the converter input shaft and each of the output shafts of a plurality of two speed transmissions connected in series. While this apparatus is satisfactory, it requires a separate differential mechanism and speed ratio responsive device for each of the two speed transmissions and it cannot be employed on any change speed transmission which provides more than two speed ratios unless the transmission comprises two or more two speed ratio transmissions connected in series. In addition, it requires mechanical drive connections to each of the transmission output shafts.

Accordingly, it is one object of the present invention to provide an improved and simplified mechanism for responding to a predetermined ratio between the speeds of two rotary members.

Another object of the invention is to provide an improved and simplified apparatus for controlling a multiple speed ratio transmission in accordance with the speed ratio of a torque converter which is connected thereto.

A more specific object of the invention is to provide means for the above stated purpose which is operated directly from the input and output shafts of the torque converter regardless of the number of speed ratios provided in the transmission or the type or number of transmissions which are connected in series to the converter output shaft.

Another object of the invention is to provide means for automatically shifting a multiple speed ratio transmission through any number of successive speed ratio changes in either direction in response to variations in the load.

Another object of the invention is to provide means of the type mentioned which is for the most part electrical in character in order to avoid a multiplicity of mechanical, pneumatic or hydraulic connections.

Other objects and advantages of the invention will become apparent from the following specification, the drawings relating thereto and the claims hereinafter set forth.

In the drawings:

Figure 1 is a diagrammatic view of a portion of the apparatus of the present invention;

Figure 2 is a longitudinal section of the speed ratio responsive device taken on the line 2—2 of Figure 1;

Figure 3 is a transverse section taken on the line 3—3 of Figure 2;

Figure 4 is a fragmentary elevation taken on the line 4—4 of Figure 3;

Figure 5 is a wiring diagram showing diagrammatically the arrangement of electrical circuits employed in the control apparatus; and Figure 6 is a modified form of the speed ratio responsive device which controls the operation of the circuit shown in Figure 5.

While the principles of the present invention may be applied in various ways, they are illustrated in the preferred form of the invention disclosed herein in the form of an apparatus which is effective to shift speed ratios in a change speed transmission in such a manner as to maintain the speed ratio of a torque converter connected to the transmission within a predetermined range.

While the efficiency curves of various forms of hydrokinetic torque converters vary somewhat depending upon the design and construction, they all have an intermediate speed ratio range at which the converter operates at or near its maximum efficiency. For purposes of the present invention, this range of speed ratios is referred to as the "efficient speed ratio range," and that range extends from what is referred to as the "minimum efficient speed ratio" to what is designated the "maximum efficient speed ratio."

From the efficiency curve of any given torque converter, it is possible to select the efficient speed ratio range for any desired application. It is only necessary that the efficiency of the converter at the minimum efficient speed ratio be approximately equal to that at the maximum efficient speed ratio. For purposes of illustration, however, it will be assumed in the present invention that the hydrokinetic torque converter employed has an efficient speed ratio range extending from a speed ratio of .25 to a speed ratio of .5. Since in the assumed case the maximum efficient speed ratio is twice the minimum efficient speed ratio, it will be apparent that if under any given load conditions the torque converter is operating at a speed ratio of .5 and the speed ratio of a transmission connected between the load and the output shaft of the converter is doubled, the speed ratio of the converter will return to .25 and the output speed of the transmission will remain substantially constant. The reverse is true for a load which would cause the converter to operate at a speed ratio of .25. Accordingly, there is employed in conjunction with the torque converter a multiple speed transmission providing a plurality of stepped speed ratios, each of which is twice that of the next lower speed ratio, and, in accordance with the present invention, automatic means of an improved type are provided for changing the speed ratio of the transmission as required in order to maintain the speed ratio of the converter within its efficient range.

The essential elements of the complete power train, as shown diagrammatically in Figure 1, include an engine 1 having an output shaft 2 which constitutes the input shaft of a hydrokinetic torque converter 3. The output shaft 4 of the torque converter is connected to a multiple speed ratio transmission 5 having an output shaft 6. The transmission 5 may be of any desired type, so long as the ratio between successive steps in speed ratio provided thereby is approximately the same as the ratio between the maximum efficient speed ratio and the minimum efficient speed ratio of the converter and so long as it incorporates power means for effecting shifts in speed ratio. Since a wide variety of multiple speed ratio transmissions satisfying these requirements is known and the particular details of construction form no part of the present invention, they are not illustrated and described herein. However, for purposes of illustration of the present invention, it is assumed that the transmission provides four different speed ratios which may be selectively rendered operative by energization of three solenoids, indicated diagrammatically at 7, 8 and 9 in Figure 5. It will be appreciated that the actual motive power required to effect shifts in speed ratio may be the solenoids 7, 8 and 9, themselves, or may constitute pneumatic or hydraulic motors which are actuated in response to energization of said solenoids. The invention may, for example, be applied to the type of four speed transmission illustrated and described in the aforementioned application of Charles M. O'Leary, which provides a low ratio when none of the control solenoids is energized, a second ratio when the solenoid 7 is energized, a third ratio when the solenoids 7 and 8 are energized, and a fourth or high ratio when all three of the solenoids 7, 8 and 9 are energized.

In accordance with the present invention, automatic electrical means are provided for energizing the solenoids 7, 8 and 9 in response to a novel form of speed ratio responsive device which gives an up shift signal when the speed ratio of the converter tends to exceed its maximum efficient ratio and a down shift signal when the speed ratio of the converter tends to fall below its minimum efficient speed ratio.

Referring to Figures 1, 2 and 3, the preferred form of the speed ratio responsive device includes a pair of aligned housings 10 and 11 mounted on a common base in slightly spaced relation. Suitably journaled with respect to the housings are five aligned shafts 12, 13, 14, 15 and 16, the shafts 13 and 15 being located wholly within the housings 10 and 11, respectively, and the shafts 12 and 16 being journaled partially in outboard bearings carried by the base and projecting at their opposite ends, respectively, into the housings 10 and 11. A countershaft 17 is suitably journaled on the housings externally thereof and is connected to the shaft 16 by a pair of gears 18 and 19 and to the shaft 12 by a pair of gears 20 and 21. Shaft 17 is connected by means of a belt 22 and a pair of pulleys 23 and 24 to the output shaft 4 of the torque converter 3, while shaft 14 is similarly connected by a belt 25 and a pair of pulleys 26 and 27 to the input shaft 2 of the torque converter. The relative sizes of the pulleys and gears are so selected that shaft 14 will be driven at a given ratio of speed with respect to the input shaft 2, the shaft 16 will be driven at a speed which is twice said given ratio with respect to the speed of the output shaft 4, and the shaft 12 will be rotated at four times said given ratio with respect to the speed of the output shaft 4. This may be accomplished, for example, by making the pulleys 26 and 27 the same size, by making pulley 24 one-half the diameter of pulley 23, by making the gears 18 and 19 the same size, and by making the gear 20 twice the diameter of gear 21. In that case, shaft 14 rotates at the speed of shaft 2, shaft 16 rotates at twice the speed of shaft 4, and shaft 12 rotates at four times the speed of shaft 4. Moreover, it will be noted that the shafts 12 and 16 rotate in the same direction but in the opposite direction with respect to the direction of rotation of shaft 14.

As a result of the above arrangement, shafts 14 and 16 will rotate at the same speed but in opposite directions when the speed ratio of the converter is .5, while shafts 12 and 14 will rotate at the same speed but in opposite directions when the speed ratio of the converter is .25. Means are provided for transmitting a driving torque to the shaft 15 from both of the shafts 14 and 16, which torque forces act in the direction of rotation of the shafts 14 and 16 and vary as a function of the difference in speeds between that of the shaft 15 and each of the shafts 14 and 16.

The preferred form of torque transmitting device illustrated in the drawings comprises an eddy current clutch of the permanent magnetic type. Thus, shafts 15 and 16 are operatively connected by an eddy current clutch comprising a multipole permanent magnet 28 fixed to the shaft 16 and positioned within an axially extending flange 29 of a clutch housing member 30 fixed to shaft 15. The flange 29 is formed of an electrically conductive material which is non-magnetic, in accordance with usual practice. The flange 29 is nested within a flange 31 on a plate 32, which is likewise fixed to the shaft 16 and is positioned alongside of the permanent magnet 28. The plate 32 and its flange 31 may be formed of soft steel. As a result of this construction, any rotation of the shaft 16 relative to the shaft 15 imposes a torque force on the shaft 15 which is proportional to the difference in speeds of the two shafts and acts in the direction of rotation of the shaft 16. Shafts 14 and 15 are connected by an eddy current clutch, indicated generally at 33; shafts 14 and 13 are connected by an eddy current clutch, indicated generally at 34; and shafts 12 and 13 are connected by an eddy current clutch, indicated generally at 35. The clutches 33, 34, and 35 are identical in construction and mode of operation to the clutch connecting shafts 15 and 16, and hence a further description is unnecessary.

As a result of the construction so far described, it will be apparent that when the shafts 2 and 4 are rotating in the same direction, opposing torque forces will be applied to the shaft 15 by the shafts 14 and 16 and likewise to the shaft 13 by the shafts 12 and 14. The arrangement is such that when the speed ratio of the converter is .5, the torque forces exerted on the shaft 15 by the shafts 14 and 16 are equal and opposite and thus completely balance each other. Similarly, the torque forces applied to the shaft 13 by the shafts 12 and 14 are equal and opposite when the speed ratio of the converter is .25. When the speed ratio of the converter is less than .5, the force exerted on shaft 15 by shaft 14 will exceed the force exerted on shaft 15 by shaft 16 and, consequently, shaft 15 will be urged in a counterclockwise direction, as viewed from the right-hand end of Figure 2. When the speed ratio of the converter exceeds .5, the net torque force exerted on the shaft 15 will be in the opposite direction, or clockwise, as viewed from the right-hand end of Figure 2. Accordingly, it will be apparent that the net force exerted on the shaft 15 reverses at the speed ratio of .5. In the same manner, the net torque force exerted on the shaft 13 reverses at the converter speed ratio of .25. These reversals of the net torque force occur at the stated converter speed ratios, regardless of variations in the speed of the input shaft 2. This is important inasmuch as the speed ratio of maximum efficiency does not change appreciably with a variation in the input speed.

The reversal of the torque forces on the shafts 13 and 15 is employed to operate a pair of electrical contacts in the transmission control circuit. These contacts are best shown in Figures 3 and 4. As there shown, a pin 36, of any suitable insulating material, is fixed to the shaft 15 by securing it to the housing of the clutch 33. Pin 36 projects through a slot 37 in the housing 11 and is normally urged toward the upper end of the slot, as viewed in Figure 3, by a light spring 38, one end of which is connected to a fixed bracket 39 and the other to the pin. The pin is provided with a transverse slot 40 in which is fixed an electrical contact bar 41, which is adapted to establish an electrical connection between a pair of stationary contacts 42 and 43.

As a result of this arrangement, as long as the speed ratio of the converter is less than .5, the net torque exerted on the shaft 15 by the eddy current clutches will hold the pin 36 at the upper end of the slot 37, as viewed in Figures 3 and 4, and, consequently, the contacts 42 and 43 will be disconnected. When the speed ratio is exactly .5, the only force holding the pin 36 at the upper end of the slot 37 is the very light force exerted by the spring 38. Consequently, on a very minute increase in the torque ratio above .5, the pin will move to the lower end of the slot 37 and close the contacts. Conversely, as soon as the speed ratio returns to .5 or less, the contacts will open. The forces required to effect such opening and closing of the electrical contacts are quite low and, consequently, the mechanism is highly sensitive. Moreover, since the forces required are negligible, the speed ratio responsive device as a whole, including the eddy current clutches, the housings 10 and 11 and the drive connections to the shafts 2 and 4, may be made very small and compact. In that connection, it may be noted that this portion of the mechanism, shown diagrammatically in Figure 1, is shown greatly enlarged as compared with the sizes of the engine, converter and transmission.

An identical switch mechanism, indicated generally at 44 and including a contact bar 45 adapted to connect stationary contacts 46 and 47, is associated with the shaft 13. However, as is apparent from the fragmentary elevation view of Figure 4, the direction of operation of the switch 44 is opposite to that of the previously described switch associated with the contacts 42 and 43. Thus, switch 44 closes on a counterclockwise rotation of shaft 13, as viewed from the right-hand end of Figure 2, and vice versa, and, therefore, switch 44 closes when the speed ratio of the converter falls below .25 and opens when the speed ratio returns to .25 or more.

It will be apparent that the mechanism so far described incorporates two electrical switches, one of which is closed only when the speed ratio of the converter tends to exceed .5 and the other only when the speed ratio tends to fall below .25. These two contacts, as best shown in Figure 5, are associated with an electrical control circuit in such a manner that they effect the necessary sequential step-by-step changes in the transmission speed ratio required to maintain the speed ratio of the converter within its efficient range, regardless of wide variations in the load.

The electrical circuit includes a pair of lines 48 and 49 which may be connected to any suitable source of electric power. The previously mentioned stationary contacts 42 and 46 are permanently connected to the line 48 by a line 50, while the other stationary contacts 43 and 47 of the switches 41 and 45 are connected, respectively, to a pair of control lines 51 and 52. As previously described, when a shift of the transmission to a higher speed ratio is required, switch 41 will close, thus energizing control line 51, while control line 52 will be energized by closure of switch 45 when a shift of the transmission to a lower speed ratio is required. As long as the torque converter is operating at its efficient speed ratio, neither of the switches 41 and 45 will be closed and, consequently, no changes in the existing speed ratio will be made. Thus, the function of the control circuit is to effect a shift of the transmission to a higher ratio when switch 41 is closed and vice versa on closure of switch 45.

The particular circuit illustrated is designed for use in connection with a four-speed transmission of the type which is normally in its low speed ratio but is shifted to progressively increased ratios upon successive energization of the solenoids 7, 8 and 9, in the manner previously described. Thus, the circuit includes a relay 53 connected in a line 54 between the lines 48 and 49, which relay contains the normally open contact 55 in the line 56 which includes the solenoid 7. Consequently, energization of the relay 53 will energize the solenoid 7. Similarly, the circuit includes a relay 57 connected in a line 58 between the lines 48 and 49, which relay contains a normally open contact 59 in the line 60 which contains solenoid 8, and also a relay 61 in line 62, which relay contains a normally open contact 63 which controls the line 64 containing solenoid 9.

As a result of this arrangement, energization of relay 53 establishes the second speed ratio, energization of both of the relays 53 and 57 establishes the third speed ratio, and energization of all three of the relays 53, 57 and 61 establishes the high speed ratio in the transmission.

Energization of the three relays 53, 57 and 61 is effected, respectively, by three additional relays 65, 66 and 67, all of which are connected between the control line 51 and the power line 49 by the respective lines 68, 69 and 70. The relay 65 has a normally open contact 71 in the line 54 for relay 53, relay 66 has a normally open contact 72 in the line 58 for the relay 57, and relay 67 has a normally open contact 73 in the line 62 of relay 61, as a result of which energization of any one or more of relays 65, 66 and 67 effects energization of the associated control relays 53, 57 and 61.

Each of the control relays 53, 57 and 61 is provided with a holding circuit which maintains the respective relays energized once they have been energized by the related relays 65, 66 and 67. Thus, the holding circuit for relay 53 includes a line 74 containing a normally open contact 75 associated with the relay 53. Accordingly, once the relay 53 is energized, it will remain energized even after the associated relay 65 is open. Thus, a momentary closure of the main control switch 41 will energize relay 53 and that relay will remain energized until de-energized by means subsequently described. Similarly, relay 57 is provided with a holding circuit 76 containing a normally open contact 77 associated with the relay 57, and relay 61 is provided with a holding circuit 78 having a normally open contact 79 associated with the relay 61.

The means for de-energizing the control relays 53, 57 and 61 includes three relays 80, 81 and 82, each of which is connected between the control line 52 and the power line 49 and each of which contains a normally closed contact in the holding circuit for one of the three control relays 53, 57 and 61. Thus, relay 81 controls a normally closed contact 83 in the holding circuit 74 for relay 53, relay 81 controls a normally closed contact 85 in the holding circuit 76 for the relay 57, and relay 82 controls a normally closed contact 86 in the holding circuit 78 for the relay 61.

Means are provided in the form of additional interlocking contacts associated with the previously described relays and two additional delayed action relays to prevent the energization or de-energization of more than one of the relays 53, 57 and 61 at a time. Thus, there is provided a delayed action relay 87 having a normally open contact 88 in a line 89 which connects the relay 80 to the power line 49. The line 69 which connects relay 66 to the power line 49 is also connected to the line 89 in such a manner that the contact 88 controls the connection between line 69 and line 49. The relay 87 is connected between the power lines 48 and 49 by a line 90, which contains a normally closed contact 91 associated with relay 57 and a normally open contact 92 associated with relay 53. An additional delayed action relay 93 having a normally open contact 94 is connected between the lines 48 and 49 by a line 95', which contains a normally closed contact 96 associated with relay 61 and a normally open contact 97 associated with relay 57. The contact 94 of relay 93 is connected between the previously mentioned line 70 and the power line 49, as well as between the line 95 containing relay 81 and the power line 49, and, consequently, controls the energization of both of the relays 67 and 81. To insure establishment of the holding circuits for relays 57 and 61, it is preferred that they be of a type in which the respective contacts 77 and 79 close in advance of the opening of contacts 91 and 96, respectively.

The delayed action relays 87 and 93 are of the type which are normally open and which close a predetermined time interval after they are energized, but open immediately upon de-energization. For the purpose of the present invention, a time delay of a few seconds will ordinarily be sufficient for the closure of the contacts 88 and 94. Since several types of relays for this purpose are known to those skilled in the art, a further description or illustration is unnecessary.

In addition to the above, a normally open contact 99 associated with the relay 61 is located in line 100, which supplies current to relay 82 from the control line 52.

The operation of the above described mechanism is as follows. If it is assumed that the transmission 5 is in its lowest gear ratio and the output shaft is stationary at the beginning of a load starting operation and the engine 1 is started at full speed, the speed ratio of the converter 3 will be zero. Consequently, switch 41 will be open and switch 45 will be closed, and the load will be accelerated under the maximum torque ratio of both the converter 3 and the transmission 5. During these conditions, closure of switch 45 has no effect upon the transmission since the circuit through relay 80 is open at 88, the circuit through relay 81 is open at 94, and the circuit through relay 82 is open at 99. Consequently, all of the elements of the electrical circuit except switch 45 will remain in the position illustrated in Figure 5. As the load accelerates, the speed ratio of the converter will increase until, in the example given, at a speed ratio of .25 switch 45 will open. This opening of the switch 45, however, has no effect upon the remaining elements of the circuit since the transmission is already in its lowest gear ratio. Further acceleration of the load may increase the speed of the converter output shaft sufficiently to raise the converter speed ratio to .5, in which event switch 41 will close, thereby energizing control line 51. This has no effect upon relay 66 because its circuit is open at contact 88, nor upon relay 67 whose circuit is open at 94. Consequently, neither of the main control relays 57 or 61 will be energized. However, a direct connection is provided through relay 65. Consequently, contact 71 will close and energize control relay 53. This energizes solenoid 7 and thereby shifts the transmission to its second speed ratio. Simultaneously with the energization of solenoid 53, contacts 75 and 92 close. Contact 75 establishes a holding circuit for the relay 53, and closure of contact 92 energizes the delayed action relay 87 and begins the delayed closure of contact 88.

As soon as the transmission begins to adjust itself to the change in speed ratio, the speed of the output shaft 4 of the converter will be reduced, thus causing a decrease in the converter speed ratio and the resulting opening of the switch 41. If the torque load on the output shaft remains unchanged, the converter speed ratio will return to approximately .25, but the decrease in converter speed ratio will be compensated for by the increase in the transmission speed ratio, with the result that the output shaft speed will remain unchanged. In that connection, it should be noted that the ratio between the maximum and minimum efficient speed ratios of the converter and the successive speed ratio steps of the transmission 5 and the points of closure of the switches 41 and 45 should be so chosen that under the conditions last stated the converter speed ratio will reduce to a point approaching but not as low as the speed ratio required to effect a closure of switch 45.

If, following the shift in transmission speed ratio, the torque load on the shaft 6 continues to fall off, the converter speed ratio will not drop back to a value approaching the minimum efficient ratio, but will ordinarily fall at least temporarily to a point below the maximum efficient speed ratio of .5. Consequently, switch 41 will ordinarily open following a shift from a lower to a higher transmission speed ratio.

The delayed action relay 87 is so designed that although it is energized simultaneously with the energization of relay 53, it will not complete a closure of contact 88 until sufficient time interval has elapsed to complete the transmission shift and permit opening of switch 41. Consequently, there is no possibility of a simultaneous energization of relays 65 and 66 or an energization of the relay 66 until a sufficient time interval has elapsed to permit the complete power transmission system to readjust itself.

After the transmission system has adjusted itself to a change in the speed ratio of the transmission, the delayed action relay contact 88 will close, thus completing the circuit from lines 51 and 52 through relays 66 and 80, respectively, to the power line 49. Consequently, a subsequent closure of switch 41, which may be induced by a further decrease in load and increase in the converter speed ratio, will energize relay 66, while an increase in load sufficient to reduce the converter speed ratio to .25 and thus close switch 45 will energize relay 80. Of these two relays, relay 66 energizes relay 57 and thereby energizes transmission shifting solenoid 8 to effect the third transmission speed ratio; while energization of the relay 80 opens the normally closed contact 83 in the holding circuit 74 of relay 53, thereby de-energizing the transmission shifting solenoid 7 and returning the transmission to its lowest speed ratio. It is apparent, therefore, that the delayed action relay 87 operates after a time interval sufficient to allow the transmission system to adjust itself to a shift into the second speed ratio to establish circuits which will permit the transmission to shift either up or down one step from that speed ratio under the influence of the switches 41 and 45.

When the solenoid 57 is energized to establish the third speed ratio, its normally closed contact 91 opens, thereby de-energizing the delayed action relay 87 and preventing subsequent energization of the relays 66 and 80. At the same time, the normally open contact 97 of relay 57 closes the circuit through the delayed action relay 93, which, in the manner previously described in connection with the relay 87, establishes circuits through which either of the relays 67 or 81 may be energized by the respective switches 41 and 45 after a time delay sufficient to enable the complete power transmission system to adjust itself to the shift into the third speed ratio. Consequently, if thereafter the load increases to a point which will cause a closure of switch 45, relay 81 will open the normally closed contact 85 on the holding circuit 76 of relay 57, thereby de-energizing relay 57 and solenoid 8. This will return the transmission to its second speed ratio.

Alternatively, if, under the above stated conditions, relay 67 is energized by reason of a decrease in load sufficient to cause a closure of switch 41, the transmission shifting relay 61 will be energized, thereby energizing solenoid 9 and effecting a shift of the transmission to its fourth or high speed ratio.

When relay 61 is energized to effect the fourth and highest speed ratio, the normally closed contact 96 in line 95 is open, thereby de-energizing the delayed action relay 93 and disconnecting the circuits through the relays 67 and 81. Consequently, subsequent closure of switches 41 and 45 will have no effect upon relays 67, 81, 66 or 80.

It will be noted that relay 82 is connected between line 52 and power line 49 when the transmission is in its highest speed ratio. Consequently, if at that time the load increases sufficiently to cause closure of switch 45, relay 82 will immediately be energized, thus de-energizing relay 61 and returning the transmission to its third speed ratio. De-energization of the relay 61 closes the contact 96 in line 95 and thus energizes the delayed action relay 93. Consequently, the delayed action relay, after a suitable delay, re-establishes the circuits through the relays 67 and 81 and thereby makes it possible for the transmission to shift either into its highest speed ratio or its second speed ratio under the influence of the switches 41 and 45, respectively. When the transmission shifts from its third to its second speed ratio, the de-energization of relay 57 closes the contact 91 in line 90 and thus energizes the delayed action relay 87. This relay, after a suitable delay, re-establishes the circuits through relays 66 and 80, thus making it possible for the transmission to shift either back to its third speed ratio or to its low speed ratio under the influence of the respective switches 41 and 45.

Contact 92 of relay 53 prevents energization of relay 61 when relay 53 is de-energized, and contact 97 of relay 57 prevents energization of relay 61 when relay 57 is de-energized. The contact 91 of relay 57 prevents de-energization of relay 53 so long as relay 57 is energized. Contact 96 of relay 61 similarly prevents de-energization of relay 57 so long as relay 61 is energized. This insures that the three relays 53, 57 and 61 will be energized and de-energized in the proper order. The delayed action relays prevent two or more successive changes in speed ratio in the same direction until the power transmitting system has time to adjust itself to each change.

It will be observed from the above that the circuit enables the two control switches 41 and 45 to effect a successive shift of the transmission through its four different speed ratios step-by-step in either direction at any time, and that only one step change in speed ratio will be effected at a time. However, in the event that the transmission is subject to such a marked and sudden change in load conditions in either direction that a shift through two or more successive speed ratio changes will be required to maintain the torque converter within its efficient speed ratio range, the apparatus automatically permits such multiple changes in speed ratio, allowing only a sufficient time interval between each step to permit the power transmission system to adjust itself to the shift of the transmission. For that reason, the period required for closure of the contacts of the delayed action relays 87 and 93 should be so adjusted as to correspond to the time interval required for the power transmission system to adjust itself to a change in speed ratio.

It will be apparent that variations in the electrical circuit may be indulged in to suit differing requirements within the principles outlined above. Thus, if the transmission provides fewer or more different speed ratios, the circuit may be extended or restricted, as required. For example, for a transmission providing only two different speed ratios, the higher of which is effected by energization of the relay 7 and the lower by de-energization of the relay 7, all portions of the circuit illustrated in Figure 5 may be dispensed with except the solenoid 7, the control switches 41 and 45 and the relays 65, 53 and 80. No delayed action relays would be required in such a case since there is no possibility of two successive shifts in the same direction.

The particular form of circuit illustrated in Figure 5 is designed to control a transmission in which one speed ratio is established by energization of solenoid 7, another speed ratio is established by the simultaneous energization of solenoids 7 and 8, and a third speed ratio is established by simultaneous energization of all three of the solenoids 7, 8 and 9. In some cases, it may be desirable to effect the successive speed ratios in the transmission by a successive energization of the solenoids 7, 8 and 9 one at a time. This can be accomplished without additional relays by simply adding four additional contacts to the relays already employed. The four additional contacts thus required are the following: a normally closed contact associated with relay 66 and located in the holding circuit 74 for relay 53; a normally open contact associated with the relay 81 and located in a separate line which connects line 48 to the left-hand end of the relay coil 53; a normally closed contact associated with the relay 67 and located in the holding circuit 76 for relay 67; and a normally open contact associated with the relay 82 and located in a separate line extending between the line 48 and the left-hand end of relay coil 57. Other variations and rearrangements of the circuit will be apparent to those skilled in the art.

In Figure 6 is shown an alternative form of speed ratio responsive device for controlling the switches 41 and 45 of Figure 5, which apparatus may be employed in lieu of that illustrated in Figures 2 through 4. As there shown, the apparatus includes a pair of contacts 42a and 43a which may be connected by a switch bar 41a and which correspond to the similarly numbered contacts and switch in Figure 5. It also includes a pair of stationary contacts 46a and 47a which may be connected by a contact bar 45a, the contacts and bar 45a corresponding to the similarly numbered elements in Figure 5. The contact 41a is subject to the action of a pair of axially aligned solenoids 101 and 102 which, when energized, tend to move the bar 41a in opposite directions. The contact bar 45a is similarly urged in opposite directions by a pair of solenoids 103 and 104. The arrangement is such that when the solenoid 102 overcomes the force exerted by the solenoid 101, switch bar 41a will close the circuit through contacts 42a and 43a, and vice versa. Likewise, when solenoid 103 exerts a greater force on the switch bar 45a than that exerted by solenoid 104, the switch bar 45a will close the circuit through the contacts 45a and 47a.

Solenoids 101 and 103 are connected in parallel to a tachometer-type generator 105, which is connected to the input shaft 2 of the torque converter 3 in such a manner as to be driven at a speed proportional to the speed of the shaft 2. The solenoid 102 is connected across the terminals of a tachometer-type generator 106, which is connected to the output shaft 4 of the torque converter 3 in such a manner that it is driven at a speed which is twice the ratio with respect to shaft 4 as that of generator 105 with respect to the speed of shaft 2. The solenoid 104 is connected across the terminals of a tachometer-type generator 107, which is connected to the output shaft 4 of the torque converter in such a manner that it is driven at a speed ratio with respect to the shaft 4 which is four times that of the speed ratio of the generator 105 with respect to the shaft 2.

All three of the generators 105, 106 and 107 are identical in construction and are preferably of the type having a flat straight-line voltage speed characteristic. Consequently, when the speed ratio of the converter is .5, the forces exerted by the solenoids 101 and 102 on the switch bar 41a will balance each other and any increase in the speed ratio of the torque converter will effect a closure of the circuit through contacts 42a and 43a. Similarly, when the speed ratio of the torque converter is .25, the forces exerted by the solenoids 103 and 104 on the switch bar 45a will balance and any decrease in the speed ratio of the converter will result in closure of the circuit through contacts 46a and 47a.

It will be apparent from the above that the apparatus shown in Figure 6 will perform exactly the same functions as that illustrated and described in connection with Figures 2, 3 and 4, and may thus be used in the same manner in connection with the circuit illustrated in Figure 5.

While several forms of the invention have been shown and described, it will be apparent that others are available within the spirit of the invention and the scope of the appended claims.

What is claimed is:

1. A device for responding to the existence of a predetermined ratio between the speeds of rotation of two members comprising a rotatably mounted actuated element, a pair of driving elements adapted to be connected to said members and driven thereby at speeds respectively proportional to the speeds of the members, means including a separate torque transmitting device connecting each driving element to said actuated element in such a manner as to transmit opposing torque forces to the actuated element, said torque transmitting devices being of the type which deliver a torque that varies as a function of the difference between the speed of the actuated element and that of the driving elements, respectively, and means for limiting rotation of the actuated element in both directions whereby said element tends to move from one limit to the other as the speed ratio of said members varies from a value less to one greater than a predetermined value.

2. A device for responding to the existence of a predetermined ratio between the speeds of rotation of two members comprising a rotatably mounted actuated element, a pair of driving elements adapted to be connected to said members and driven thereby at speeds respectively proportional to the speeds of the members, means including a separate magnetic eddy current clutch connecting said actuated element to each of the driving elements in such a manner as to impose oppositely directed torque forces to the actuated element, and means for limiting rotation of the actuated element in both directions whereby said element tends to move from one limit to the other as the speed ratio of said members varies from a value less to one greater than a predetermined value.

3. A device for responding to the existence of a predetermined ratio between the speeds of rotation of two members comprising a rotatably mounted actuated element, a pair of driving elements adapted to be connected to said members and driven thereby at speeds respectively proportional to the speeds of the members, means including a separate torque transmitting device connecting each driving element to said actuated element in such a manner as to transmit opposing torque forces to the actuated element, said torque transmitting devices being of the type which deliver a torque that varies as a function of the difference between the speed of the actuated element and that of the driving elements, respectively, means for limiting rotation of the actuated element in both directions whereby said element tends to move from one limit to the other as the speed ratio of said members varies from a value less to one greater than a predetermined value, and an electric control switch operatively associated with said actuated element and adapted to open or close on movement of the actuated element from one limit to the other.

4. A device for responding to the existence of a predetermined ratio between the speeds of rotation of two members comprising a rotatably mounted actuated element, a pair of driving elements adapted to be connected to said members and driven thereby at speeds respectively proportional to the speeds of the members, means including a separate magnetic eddy current clutch connecting said actuated element to each of the driving elements in such a manner as to impose oppositely directed torque forces to the actuated element, means for limiting rotation of the actuated element in both directions whereby said element tends to move from one limit to the other as the speed ratio of said members varies from a value less to one greater than a predetermined value, and an electric control switch operatively associated with said actuated element and adapted to open or close on movement of the actuated element from one limit to the other.

5. In combination, a change speed ratio transmission adapted to provide at least three different speed ratios, a pair of electrical switches, each having an ineffective and an effective position, means automatically operable when one of said switches is in effective position to change said transmission to its next higher speed ratio when the transmission is in one of its lower ratios, means automatically operable when the other of said switches is in effective position to change said transmission to its next lower ratio when it is in one of its higher ratios, and means for placing said switches one at a time in effective position.

6. In combination, a change speed ratio transmission adapted to provide at least three different speed ratios, a pair of electrical switches, each having an ineffective and an effective position, means automatically operable when one of said switches is in effective position to change said transmission to its next higher speed ratio when the transmission is in one of its lower ratios, means automatically operable when the other of said switches is in effective position to change said transmission to its next lower ratio when it is in one of its higher ratios, means for placing said switches one at a time in effective position, and means automatically operable after a change of speed ratio in either direction for effecting a second change of speed ratio in the same direction in the event that the switch which effected the first change remains in effective position for a predetermined time interval following the first change.

7. In combination, a change speed ratio transmission adapted to provide at least three different speed ratios, a shifting control instrumentality operable from a neutral condition to either an up-shift condition or a down-shift condition, transmission shifting mechanism effective to shift said transmission to the next higher speed ratio when said instrumentality is in an up-shift condition and the transmission is in either of its lower ratios and to shift the transmission to the next lower speed ratio when said instrumentality is in a down-shift condition and the transmission is in either of its higher ratios, and means automatically operable after a change in speed ratio has been made in either direction to an intermediate speed ratio for effecting a second change of speed ratio in the same direction in the event that said instrumentality remains in the condition which effected the first change for a predetermined time interval following said first change.

8. In combination, a hydrokinetic torque converter, a change speed transmission driven by the converter and adapted to provide at least three different speed ratios, a transmission shifting control instrumentality operable from a neutral condition to either an up-shift condition or a down-shift condition, transmission shifting mechanism effective to shift said transmission to the next higher speed ratio when said instrumentality is in an up-shift condition and the transmission is in either of its lower ratios and to shift the transmission to the next lower speed ratio when said instrumentality is in a down-shift condition and the transmission is in either of its higher ratios, and means operative in response to the speed ratio of the converter for placing said instrumentality in its up-shift condition when the speed ratio of the converter equals or exceeds a predetermined value and in its down-shift condition when the speed ratio of the converter equals or is less than a lower predetermined value.

9. In combination, a hydrokinetic torque converter, a change speed transmission driven by the converter and adapted to provide at least three different speed ratios, a transmission shifting control instrumentality operable from a neutral condition to either an up-shift condition or a down-shift condition, transmission shifting mechanism effective to shift said transmission to the next higher speed ratio when said instrumentality is in an up-shift condition and the transmission is in either of its lower ratios and to shift the transmission to the next lower speed ratio when said instrumentality is in a downshift condition and the transmission is in either of its higher ratios, means operative in response to the speed ratio of the converter for placing said instrumentality in its up-shift condition when the speed ratio of the converter equals or exceeds a predetermined value and in its downshift condition when the speed ratio of the converter equals or is less than a lower predetermined value, and means automatically operable after a change in speed ratio has been made in either direction to an intermediate speed ratio for effecting a second change of speed ratio in the same direction in the event that said instrumentality remains in the condition which effected the first change for a predetermined time interval following said first change.

10. In combination, a two speed ratio transmission, a hydrokinetic torque converter for delivering power to said transmission, a pair of electrical switches, each having an ineffective and an effective position, means for shifting said transmission from a lower speed ratio to a higher speed ratio when one of said switches is in effective position and for shifting said transmission back to its lower speed ratio when the other switch is in effective position, and means operable in response to the speed ratio of the converter for placing said one switch in effective position when the speed ratio of the converter equals or exceeds a predetermined value and for placing the other switch in its effective position when the speed ratio of the converter equals or exceeds a lower predetermined value.

11. In combination, a multiple speed ratio transmission adapted to provide at least three speed ratios, means including a series of electrical devices adapted when energized in a predetermined succession to effect successive shifts in the speed ratio of said transmission in one direction and when de-energized in reverse succession to effect successive shifts in the opposite direction, a pair of electrical control switches, one of which when closed is adapted to energize all of said devices and the other of which is adapted when closed to de-energize all of said devices, and automatic means to prevent energization or de-energization of all of said devices except the devices which effect the next successive speed ratio shift in either direction from any established speed ratio.

12. In combination, a multiple speed ratio transmission adapted to provide at least three speed ratios, means including a series of electrical devices adapted when energized in a predetermined succession to effect successive shifts in the speed ratio of said transmission in one direction and when de-energized in reverse succession to effect successive shifts in the opposite direction, a pair of electrical control switches, one of which when closed is adapted to energize all of said devices and the other of which is adapted when closed to de-energize all of said devices, and automatic means to delay energization or de-energization of all of said devices except the devices which effect the next successive speed ratio shift in either direction from any established speed ratio.

13. In combination, a multiple speed ratio transmission adapted to provide at least three speed ratios, means including a series of electrical devices adapted when energized in a predetermined succession to effect successive shifts in the speed ratio of said transmission in one direction and when de-energized in reverse succession to effect successive shifts in the opposite direction, a pair of electrical control switches, one of which when closed is adapted to energize all of said devices and the other of which is adapted when closed to de-energize all of said devices, and automatic means to delay energization or de-energization of all of said devices except the devices which effect the next successive speed ratio shift in either direction from any established speed ratio, said last mentioned means including a delayed action relay which is actuated simultaneously with the energization of each device except the last in the series and is operative to prevent energiaztion of the next succeeding device until after a predetermined time interval.

14. In combination, a multiple speed ratio transmission adapted to provide at least three speed ratios, means including a series of electrical devices adapted when energized in a predetermined succession to effect successive shifts in the speed ratio of said transmission in one direction and when de-energized in reverse succession to effect successive shifts in the opposite direction, a pair of electrical control switches, one of which when closed is adapted to energize all of said devices and the other of which is adapted when closed to de-energize all of said devices, and automatic means to delay energization or de-energization of all of said devices except the devices which effect the next successive speed ratio shift in either direction from any established speed ratio, said last mentioned means including a delayed action relay which is actuated simultaneously with the de-energization of each device except the first in the series and is operative to prevent energization of the next preceding device until after a predetermined time interval.

15. In combination, a two speed ratio transmission, a hydrokinetic torque converter for delivering power to said transmission, a pair of electrical switches, each having an ineffective and an effective position, means for shifting said transmission from a lower speed ratio to a higher speed ratio when one of said switches is in effective position and for shifting said transmission back to its lower speed ratio when the other switch is in effective position, a member differentially connected between and driven by the input and output shafts of the converter, said drive connection between said shafts and member being such that the member tends to remain stationary when said output shaft is rotating at a predetermined speed ratio to that of the input shaft, means for operating said one of said switches from its ineffective to its effective position when said member moves in the direction induced by a rotation of said output shaft at a speed ratio to that of said input shaft which exceeds said predetermined ratio, a second member differentially connected between and driven by the input and output shafts of the converter, said drive connection between said shafts and said second member being such that the second member tends to remain stationary when said output shaft is rotating at a second predetermined speed ratio to that of the input shaft which is lower than said first-mentioned predetermined ratio, and means for operating said other switch from its ineffective to its effective position when said second member moves in the direction induced by a rotation of said output shaft at a ratio to that of the input shaft which is less than said second predetermined ratio.

JOHN A. BLAIR.

REFERENCES CITED

The following references are of record in the file of this patent:

UNITED STATES PATENTS

| Number | Name | Date |
|---|---|---|
| 2,170,237 | Farmer et al. | Aug. 22, 1939 |
| 2,321,059 | Anderson | June 8, 1943 |
| 2,373,453 | Brunken | Apr. 10, 1945 |

FOREIGN PATENTS

| Number | Country | Date |
|---|---|---|
| 7,589 | Great Britain | 1908 |
| 356,737 | Germany | July 26, 1922 |